United States Patent
Behrends

(10) Patent No.: US 6,504,953 B1
(45) Date of Patent: Jan. 7, 2003

(54) METHOD FOR THE AUTOMATIC REMOVAL OF IMAGE ERRORS

(75) Inventor: Rolf Behrends, Kiel (DE)

(73) Assignee: Heidelberger Druckmaschinen Aktiengesellschaft, Heidelberg (DE)

( * ) Notice: Subject to any disclaimer, the term of this patent is extended or adjusted under 35 U.S.C. 154(b) by 0 days.

(21) Appl. No.: 09/376,476

(22) Filed: Aug. 18, 1999

(51) Int. Cl.⁷ .................................................. G06K 9/00
(52) U.S. Cl. ........................ 382/167; 382/257; 382/258; 382/259
(58) Field of Search .......................... 382/30, 257, 258, 382/259, 197, 167, 163, 199, 205, 173, 275, 175, 283, 50, 104; 358/531, 532, 1.9, 527, 518, 517, 515, 520, 533; 364/526

(56) References Cited

U.S. PATENT DOCUMENTS

| | | | | |
|---|---|---|---|---|
| 4,868,884 A | * | 9/1989 | Miyazaki et al. ............ 382/199 |
| 5,134,668 A | * | 7/1992 | Appel ........................ 358/3.13 |
| 5,619,592 A | * | 4/1997 | Bloomberg et al. .......... 382/175 |
| 5,659,490 A | * | 8/1997 | Imamura ..................... 345/589 |
| 5,859,929 A | * | 1/1999 | Zhou et al. .................. 382/175 |
| 5,887,082 A | * | 3/1999 | Mitsunaga et al. .......... 358/517 |
| 6,167,167 A | * | 12/2000 | Matsugu et al. ............. 358/538 |
| 6,212,287 B1 | * | 4/2001 | Olivieri et al. .............. 382/104 |
| 6,404,936 B1 | * | 6/2002 | Katayama et al. ........... 345/626 |

* cited by examiner

Primary Examiner—Joseph Mancuso
Assistant Examiner—Brian Le
(74) Attorney, Agent, or Firm—Schiff Hardin & Waite

(57) ABSTRACT

In a method for automatic removal of image errors in digital image data, for example which have arisen due to scratches, hairs, etc., a contour mask is generated with a contour filter and a color mask is additionally generated that covers the image areas having the typical color of an image error. By operating the contour mask and the color mask, an error mask arises that is also automatically corrected and is manually edited as warranted. The remaining contours of the error mask are vectorized. An automatic bleeding retouch is then implemented along the vectorized contours.

8 Claims, 5 Drawing Sheets

| -1 | -2 | -1 |
|---|---|---|
| -2 | 12 | -2 |
| -1 | -2 | -1 |

METHOD FOR THE AUTOMATIC REMOVAL OF IMAGE ERRORS

BACKGROUND OF THE INVENTION

The invention is in the field of electronic reproduction technology and is directed to a method for the automatic removal of errors in a digitally stored image.

In reproduction technology, print masters for printing pages are produced that contain all page elements such as texts, graphics and images to be printed. In the case of electronic production of the print masters, these elements are present in the form of digital data. For example, the data are generated for an image in that the image master is scanned point-by-point and line-by-line in a scanner, each picture element is resolved into color components, and the color values of these components are digitized. Dependent on the output process employed later, for example output on a color printer or printing in a conventional printing press, the data for the page elements are generated and stored in the color components red, green and blue (RGB) or in the inks of four-color printing cyan, magenta, yellow and black (CMYK).

During the course of further work, the digitized images together with the texts and graphics are electronically mounted at a computer work station under visual control, being mounted on a color monitor or automatically according to stored layout rules. The finished printing page is thereby converted into a data format suitable for the output and is stored. The printing page data for each of the inks (RGB or, respectively, CMYK) are referred to as color separation data. Printing plates for a conventional printing press are manufactured with the color separation data, or they are transmitted directly to a color printer or to a digital printing press and are printed out thereat.

It occurs that the image data of the scanned images exhibit faulty locations such as, for example, scratches in the original master or error locations that arise due to hairs, fibers, etc. that adhere to the image master during the scan process. Such errors must be corrected in the reproduction before the images can be printed. For that purpose, various electronic retouch methods are utilized in the prior art.

A known retouch method is copying retouch as disclosed by European Letters Patent 0 111 026. It is used in order to transfer information of an image area onto another image area picture element by picture element. Error locations in the image can thus be eliminated in that picture elements from a neighboring image area having similar color and structure are copied into the damaged image area. For implementing the retouch, the operator simultaneously moves a read mark and a write mark with a computer mouse at a computer workstation in which the image to be retouched is stored, said read mark and write mark being mixed on the picture screen. The read mark indicates a read area of the image, and the write mark indicates a write area in which the error location is located. The picture elements situated under the read mark in the stored image are thereby continuously transferred into the corresponding picture elements under the write mark.

Another method suitable for the elimination of error locations is known under the name of "bleeding retouch". Two marks mixed into the picture screen are thereby likewise moved with the computer mouse by the operator. One mark is located at the one side of the error location, for example one side of a scratch, and the other mark is located at the opposite side of the error location. Two picture elements are read from the stored image that lie at the locations identified by the marks. Intermediate values are interpolated from the color separation values of the picture elements that are being read for all picture elements that lie on the connecting line between the, two marks and these intermediate values are written into the picture elements on the connecting line. In this way, the error location is covered with color values that are adapted to the colors in the neighborhood of the error location.

European Letters Patent 0 768 621 discloses a partially automated method for illuminating error locations. First, the operator manually identifies the error locations as a bit map in-a mask memory. The picture elements of the error locations identified in the bit map are then corrected with a specific window operator. The window operator places line segments over every picture element of the error location from different angles, whereby the outer ends of the line segments project into non-defective neighboring regions of the error location. The color values of the non-defective picture elements are compared along each line segment to color values that were acquired from an interpolation model. The line segment that exhibits the fewest interpolation errors is then selected. Finally, the defective pixel of the error location is interpolated along the selected line segment according to the interpolation model.

In European Letters Patent 0 614 154, the operator places a narrow limiting mask over an arrow location and the picture elements within the mask are colored white. The continuous color values in a processing area around the limiting mask are converted into a sequence of binary images, in that the color values are compared to thresholds that increase step-by-step. The contour of each binary image is diminished by an edge width that corresponds to the width of the limiting mask. The shape of the limiting mask is thereby eliminated. Subsequently, the modified shape of each binary image is again enlarged by the same edge width, and the sequence of binary images is converted back into an image having continuous color values. The error location is then eliminated from this image.

Methods known from the prior art for removing image errors have the disadvantage that an operator must first seek the position of the error locations in the image and identify them, this being extremely time-consuming. Moreover, error locations can thereby be overlooked by the operator. Subsequently, the operator must manually correct the error locations by interactive retouch in most methods, in that he moves marks mixed in on the picture screen over the error locations. This requires additional time expenditure.

SUMMARY OF THE INVENTION

It is therefore an object of the present invention to avoid the disadvantages of the known methods for removing image errors in digital image data and to specify a new, improved method that enables an automatic removal of error locations. Error locations can thus be removed from an image significantly faster then is possible with the known methods.

According to the method of the invention for automatic removal of image errors in digital image data, a contour mask is produced with a contour filter. The color mask is generated. An error mask is produced by a logical AND operation of the contour mask and the color mask. Contours in the error mask are pared down and vectorized. An automatic bleeding retouch of the digital image data is implemented over the vectorized contours of the error mask.

DESCRIPTION OF THE PREFERRED EMBODIMENTS

In the inventive method of removing image errors, the error locations are found and illuminated by a sequence of automatically sequencing steps, whereby the operator has essentially only a monitoring function.

Figure 1:
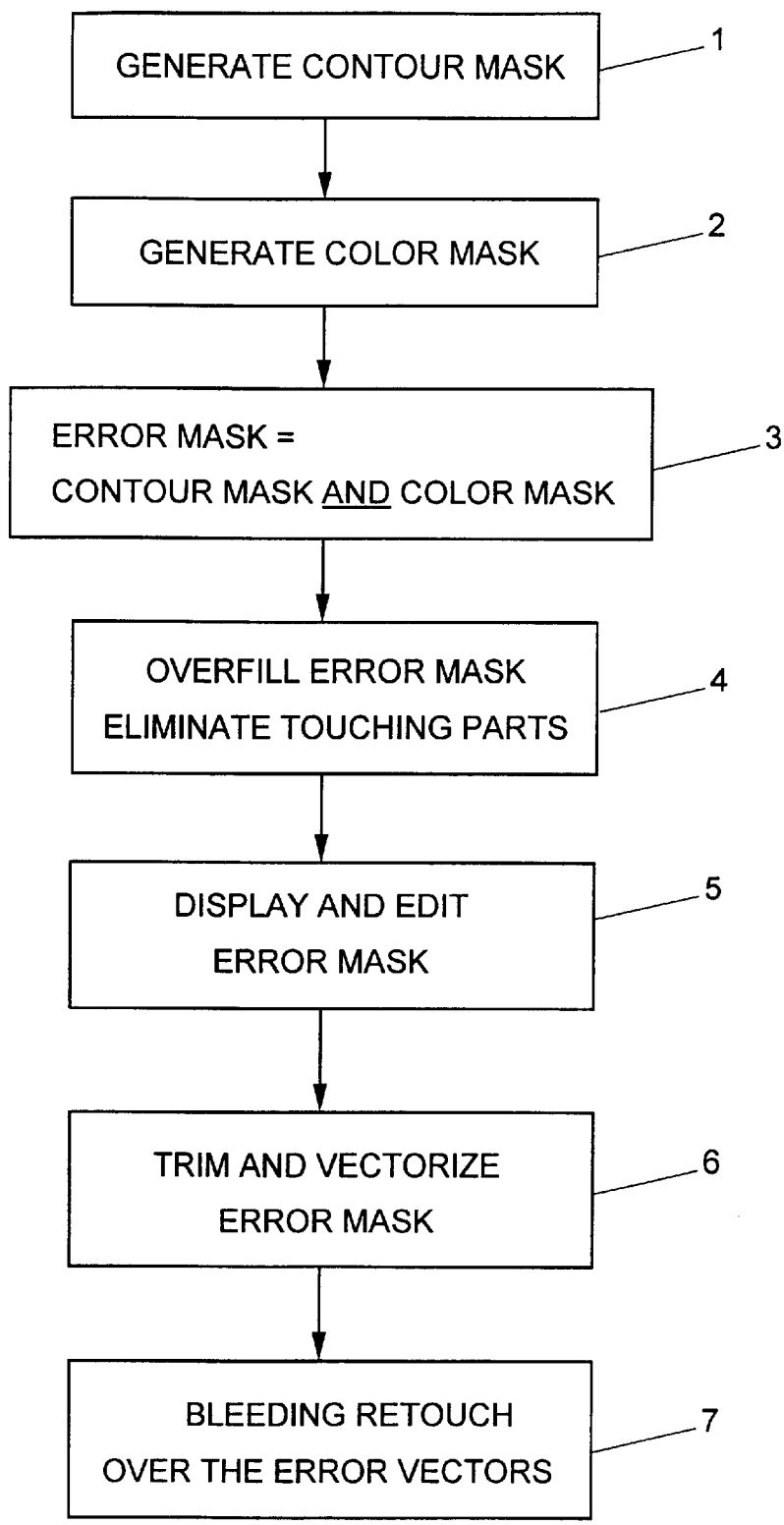
FIG. 1 is a flow chart for the inventive sequence of processing steps.

FIG. 1 shows the sequence of the steps as a flow chart. In the first step 1, a contour mask is generated as bit map, i.e. an image having only two brightness values, black and white. In the contour mask, the black picture elements indicate the locations at which contours are present in the original image.

Figures 2, 3:
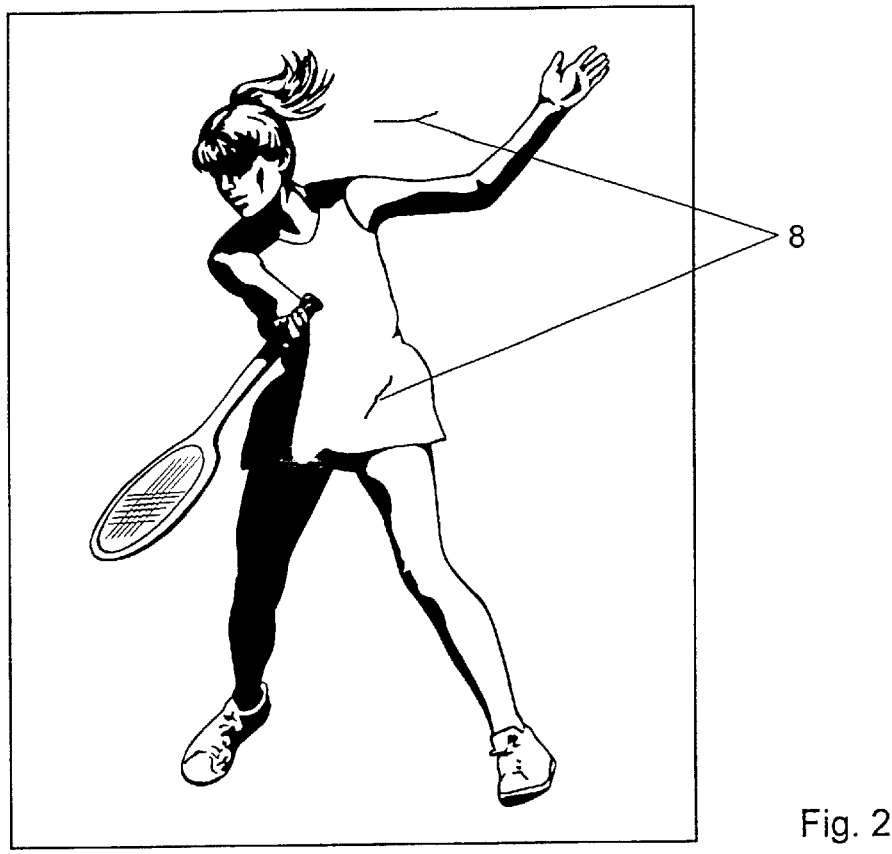
FIG. 2 is an example of an image having error locations.
FIG. 3 is an example of a contour filter.

FIG. 2 shows an example of an image that contains two error locations (8). Since such error locations usually contrast clearly with the background, they are acquired by the contour mask together with the other contours of the image. The contour mask is generated in that a digital contour filter is applied to an image component that reproduces the contours of the image as clearly as possible. For that purpose, a luminance component is preferably employed that, for example, can be acquired by the transformation of the image data into the CIELAB color system (CIE= Commission Internationale D'Éclairage). A luminance component, however, can also be acquired by a weighted addition of the color separation components (RGB or, respectively, CMYK). By way of substitute, an individual color component, for example the magenta component, can also be employed as a luminance component. A filter having a high-pass characteristic is employed as the contour filter, i.e. a filter that generates a high output value at contours and a low output value in image areas having little detail.

As an example, FIG. 3 shows a simple digital contour filter (9) with a filter window that extends over 3×3 pixels. The circled point P references the position of the current pixel. The values $h_{ij}$ at each position of the filter window are the filter coefficients. The filtering is implemented in that the Point P of the filter window is placed over each pixel of the luminance component, and the pixel values $L_{ij}$ lying under the respective window positions are multiplied by the coefficient $h_{ij}$ and are added up. The filter value F of each filter thus derives as:

$$F=\Sigma(h_{ij} \times L_{ij}) \quad (1)$$

For the present invention, the shape of the filter window and the exact values of the coefficients of the contour filter shown in FIG. 3 are not critical. Filter windows having more than 3×3 pixels and with different values for the coefficients can also be employed. The only thing important is that it is mainly the contours in the image that are emphasized by the filtering.

The contour map is acquired as a bit map from the filtered luminance image in that the filter values F are compared to thresholds. Since the contour filter, dependent on the direction of the luminance discontinuity at a contour, generates positive and negative output values, it is expedient to define only an upper threshold S1 with which the luminance discontinuities from bright to dark in the contour mask are acquired. Since, moreover, the error locations are extremely dark, it is also advantageous to place the threshold S1 relatively high so that it is mainly the error locations that are acquired and less the natural contours of the image. The bit map of the contour mask is then produced in that filter values F that lie above the threshold S1 are converted into the binary value 1 and filter values that lie below the threshold S1 are converted into the binary value 0.

$$\text{Bitmap}=1 \text{ for } F>S1 \text{ Bitmap}=0 \text{ for } F \leq S1 \quad (2)$$

Figure 4:
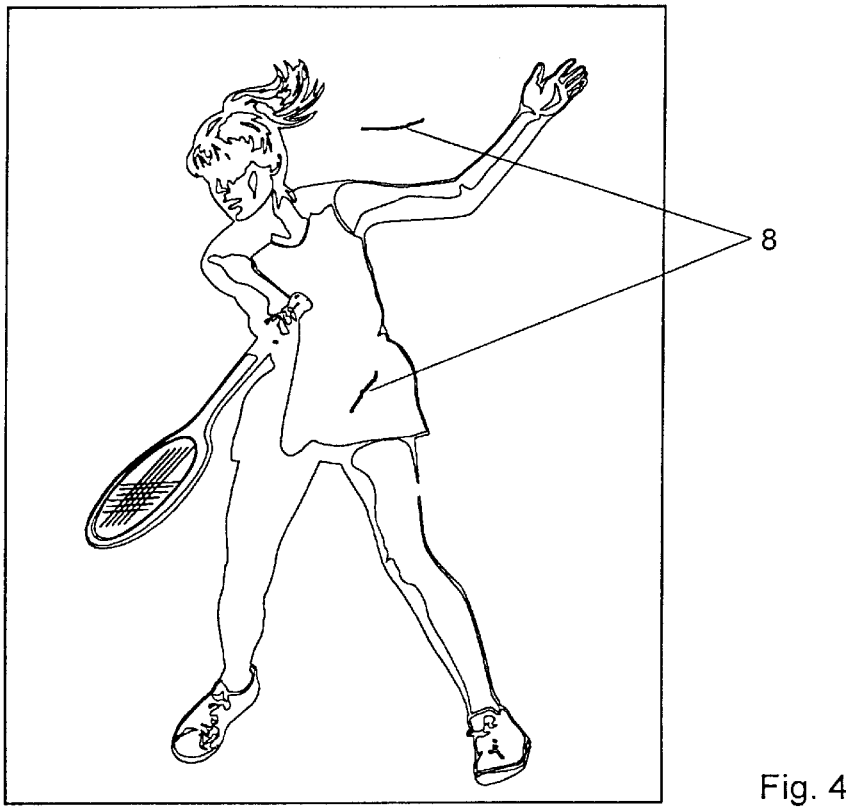
FIG. 4 shows an example of a contour mask.

FIG. 4 shows the contour mask acquired in this way for the exemplary image of FIG. 2. One can see that the contour mask contains both a part of the natural image contour as well as the contours of the error locations 8.

In the next processing step (Step 2 in FIG. 1), a color mask is produced from the original image as a bit map in which dark colors are identified as black points. This is based on the observation that typical error locations in the image such as scratches and hairs, are extremely dark. The color mask is acquired, for example, from the luminance component that already served the purpose of producing the contour mask in that the picture elements of the luminance component are compared to a threshold. Alternatively, a separate threshold can be defined for each color separation component. Those picture elements in the color mask are then identified wherein all color separation components are darker than the respective threshold. Instead of being acquired with a simple threshold decision, the color mask, however, can also be acquired with a method for selective color recognition. For example, all picture elements are identified in the color mask that lie in a small volume around a typical color of an error location in the RGB system, CMYK system, LAB system or in some other color system. The shape of the volume can, for example, be a ball or an ellipsoid.

Figure 5:
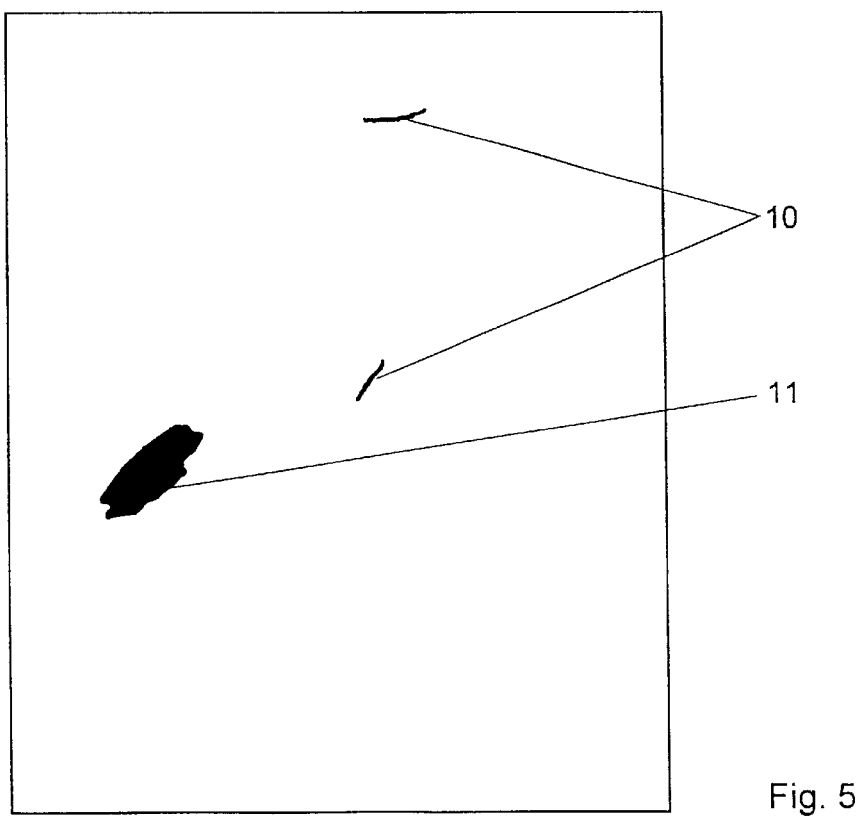
FIG. 5 shows an example of a color mask.

FIG. 5 shows the color mask for the exemplary image of FIG. 2. The normal case was thereby assumed that the error locations in the image are darker then the regions around most natural contours of the image, so that the regions in the color mask are contained around the error locations 10 and a few regions are contained around the natural contours. In this example, there is a region 11 in the tennis racket that is additionally acquired by the color mask.

Figure 6:
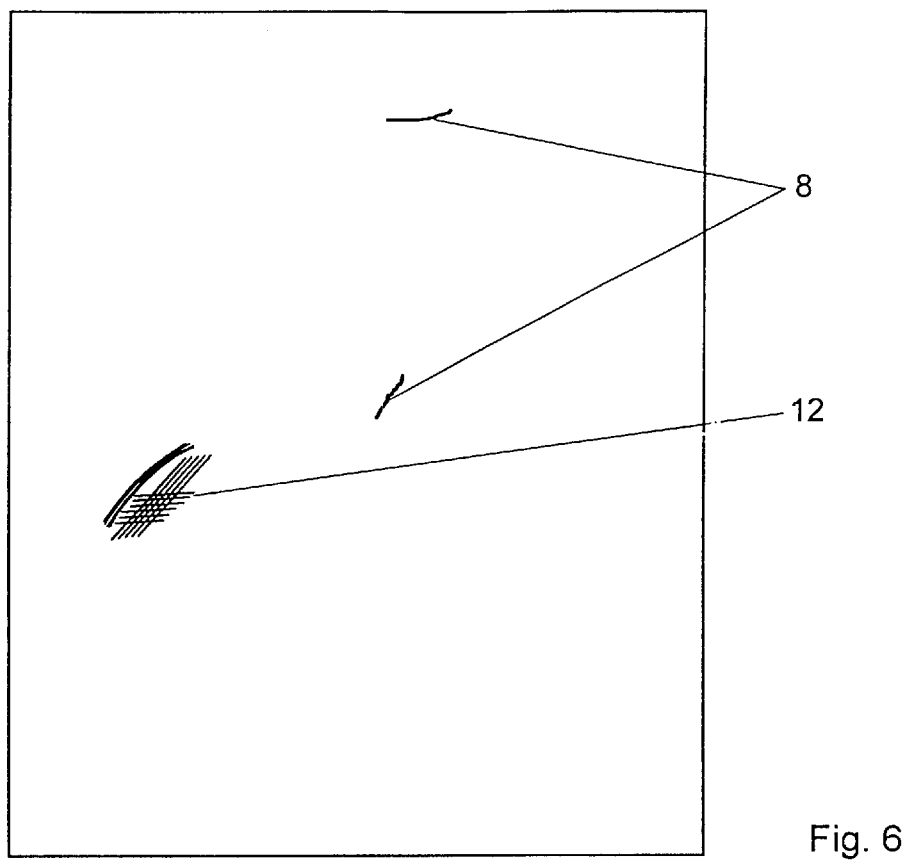
FIG. 6 is an example of an error mask.

In the next processing step (Step 3 in FIG. 1), an error mask is generated in that the contour mask and the color mask are operated with one another by the logical AND function. As a result thereof, nearly all natural contours of the image that are still contained in the contour mask are suppressed. FIG. 6 shows the result in which only the error locations 8 and a few contours in the tennis racket 12 are contained.

In the next processing Step (Step 4 in FIG. 1), the areas remaining in the error mask are over-filled. For that purpose, a frame having a specific width is placed around the contours of the error mask, this width being dependent on the resolution of the image. The frame width preferably amounts to a few pixels. During the over-filling, a check is carried out to see whether the frame touches other existing pixels of the error mask. When this is the case, the parts of the over-filled error mask that touch are eliminated. The processing step 4 has the job of eliminating regions from the error wherein natural contours lie in close proximity to one another in a dark part of the image, for example in the region wherein real hair is imaged.

Figure 7:
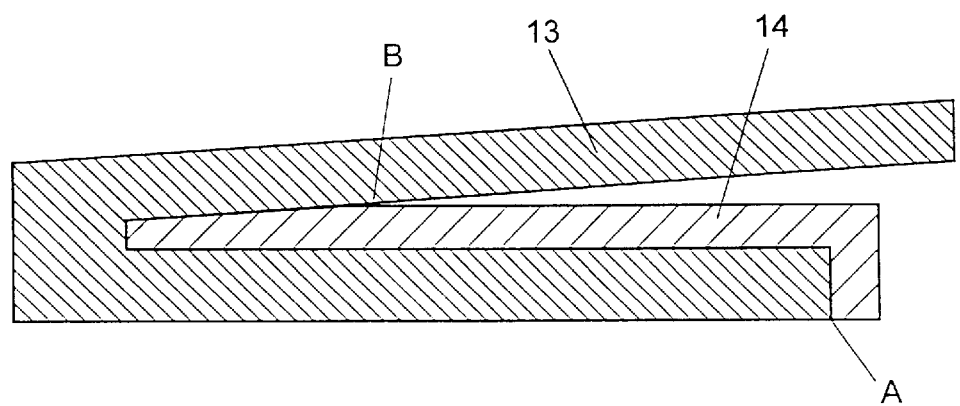
FIG. 7 illustrates the over-filling of a contour.

FIG. 7 schematically shows the over-filling of a contour 13. At an arbitrary starting point A, one begins to generate a frame 14 having a defined width around the contour 13 purpose, an arbitrary algorithm for frame formation that is known and described in the technical literature is employed. The exact algorithm for producing the frame is not critical for the inventive sequence of the processing steps. When the frame touches the contour 13 at any point B, the contour including the sub-frame already generated is deleted. When the frame touches another neighboring contour, both contours are deleted. Only when the frame generation is possible without touching around the entire contour back to the starting point A is the contour preserved. The contour 13 and the frame 14 have been shown with different hatching in FIG. 7 so that they can be distinguished from one another. Both are written as black pixels in the bit map of the error mask.

It is assumed in the example of FIG. 6 that the remaining natural contours in the tennis racket 12 can be deleted from the error mask with the over-filling and elimination of contours that touch. As a result, only the contours of the error locations 8 are then contained in the error mask.

For monitoring by the operator, the error mask is displayed on the picture screen in the next processing step (Step 5 in FIG. 1), for example in that it is superimposed on the image in a transparent color. When remaining contours are still contained in the error mask that do not belong to error locations, the operator can manually delete these with a brush retouch function at this point of the processing sequence. The operator can likewise add error locations that were possibly not recognized by the automatic processing with the brush retouch function in the error mask.

In the next processing step (Step 6 in FIG. 1), the contours in the error mask are pared down in that pixels are removed from the outer edge of the contours until a contour having a width of only one pixel remains. This pared down contour is then vectorized in that linear segments of the pared down contour are respectively converted into a vector. Any desired algorithm that is known and described in the technical literature can be employed for the sub-processes of paring and vectorizing. The exact algorithms are not critical for the inventive sequence of the processing steps.

Figure 8:
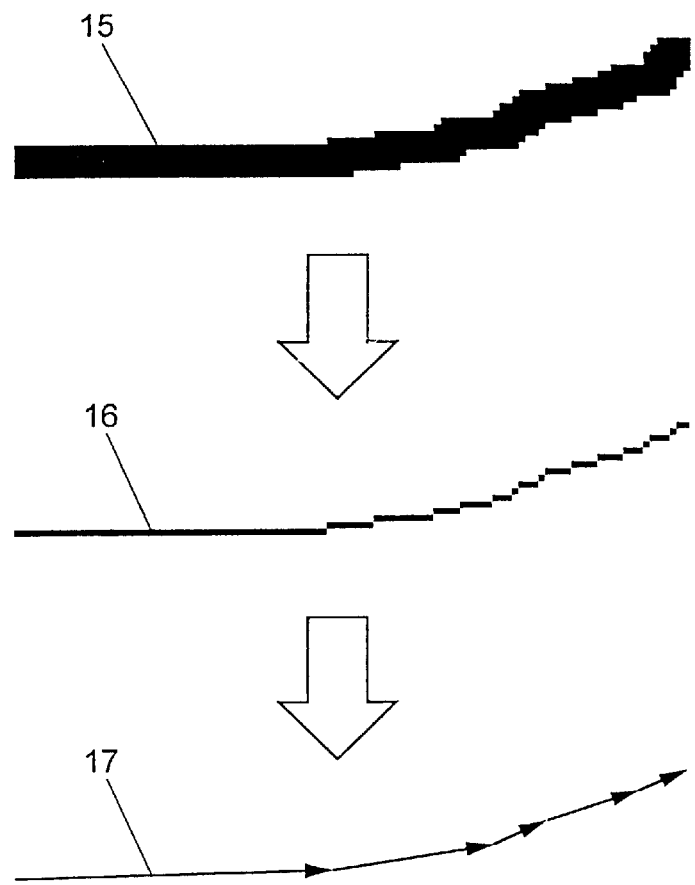
FIG. 8 shows the saving and vectorizing of a contour.

FIG. 8 shows a magnified contour of an error location 15 from the error mask, the contour (16) paired down to a width of one pixel, and the vectorized contour 17.

In the last processing step (Step 7 in FIG. 1), a bleeding retouch is automatically implemented in the original image along the vectorized contours 17 of the error mask and the error location are thus removed.

Figure 9:
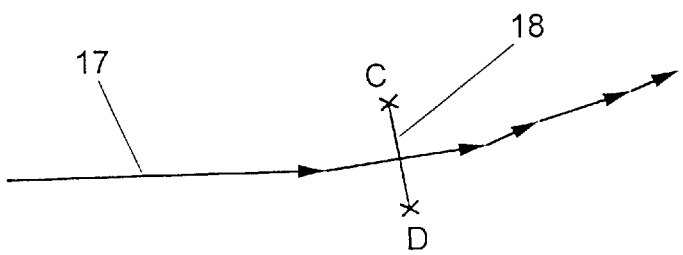
FIG. 9 illustrates the automatic bleeding retouch over a vectorized contour.

FIG. 9 shows the bleeding retouch. A line segment 18 is formed approximately perpendicularly relative to the respective vector for each pixel that lies on the vectorized contour 17. Two picture elements that lie at the ends C and D of the line segment 18 are read from the stored image. Corrected color separation values are interpolated from the color separation values of the picture elements that have been read for all picture elements that lie on the line segment 18 between the two end points C and D and are written into the picture elements on the line segment. In this way, the arrow location is covered with color values that are matched to the colors in the proximity of the arrow location. The length of the line segment 18 is expediently selected such that the end points C and D lie outside the typical width of error locations such as scratches and hairs.

Although various minor modifications might be suggested by those skilled in the art, it should be understood that I wish to embody within the scope of the patent warranted hereon all such modifications as reasonably and properly come with the scope of my contribution to the art.

I claim as my invention:

1. A method for automatic removal of image errors in digital image data, comprising the steps of:
   producing a contour mask with a contour filter;
   generating a color mask;
   producing an error mask by a logical AND operation of the contour mask and the color mask;
   paring down by removing pixels from outer edges of contours and vectorizing the contours in the error mask; and
   implementing an automatic bleeding retouch of the digital image data over the vectorized contours of the error mask.

2. The method according to claim 1 wherein the contour filter is applied to a luminance component of the digital image data.

3. The method according to claim 1 wherein the color mask is produced by comparison of the digital image data to thresholds.

4. The method according to claim 1 wherein the automatic bleeding retouch is implemented in that a line segment is generated approximately perpendicularly relative to the respective vector for each picture element on a vectorized contour, and corrected image data are interpolated from the image data of the picture elements at ends of the line segment for the picture elements that lie on the line segment.

5. The method according to claim 1, wherein the error mask is automatically corrected in that the contours are over-filled, and contours that touch are then illuminated.

6. The method according to claim 1 wherein the error mask is displayed on a picture screen together with the image data and is edited by the operator.

7. A method for automatic removal of image errors in digital image data, comprising the steps of:
   producing a contour mask with a contour filter;
   generating a color mask;
   producing an error mask by a logical AND operation of the contour mask and the color mask;
   vectorizing contours in the error mask; and
   implementing an automatic bleeding retouch of the digital image data over the vectorized contours of the error mask.

8. A method for automatic removal of image errors in digital image data, comprising the steps of:
   generating a contour mask;
   generating a color mask;
   producing an error mask from the contour mask and the color mask;
   over-filling the error mask and eliminating touching parts;
   displaying and editing the error mask;
   trimming by removing pixels at an outside of contour edges and vectorizing the contours of the error mask; and
   implementing a bleeding retouch of the digital image data over the error vectors.

* * * * *